3,555,096
D-HOMOGONA-4,9-DIENES AND PROCESS
Gordon Alan Hughes, Wayne, Herchel Smith, 500 Chestnut Lane, Wayne, Pa. 19087, and David Hartley, Conshohocken, Pa.; said Hughes and said Hartley assignors to said Smith
Application Aug. 3, 1964, Ser. No. 386,986, now Patent No. 3,458,579, dated July 29, 1969, which is a continuation-in-part of application Ser. No. 194,972, May 5, 1962, now Patent No. 3,502,699. Divided and this application Sept. 5, 1968, Ser. No. 777,534
Int. Cl. C07c 49/48
U.S. Cl. 260—586     8 Claims

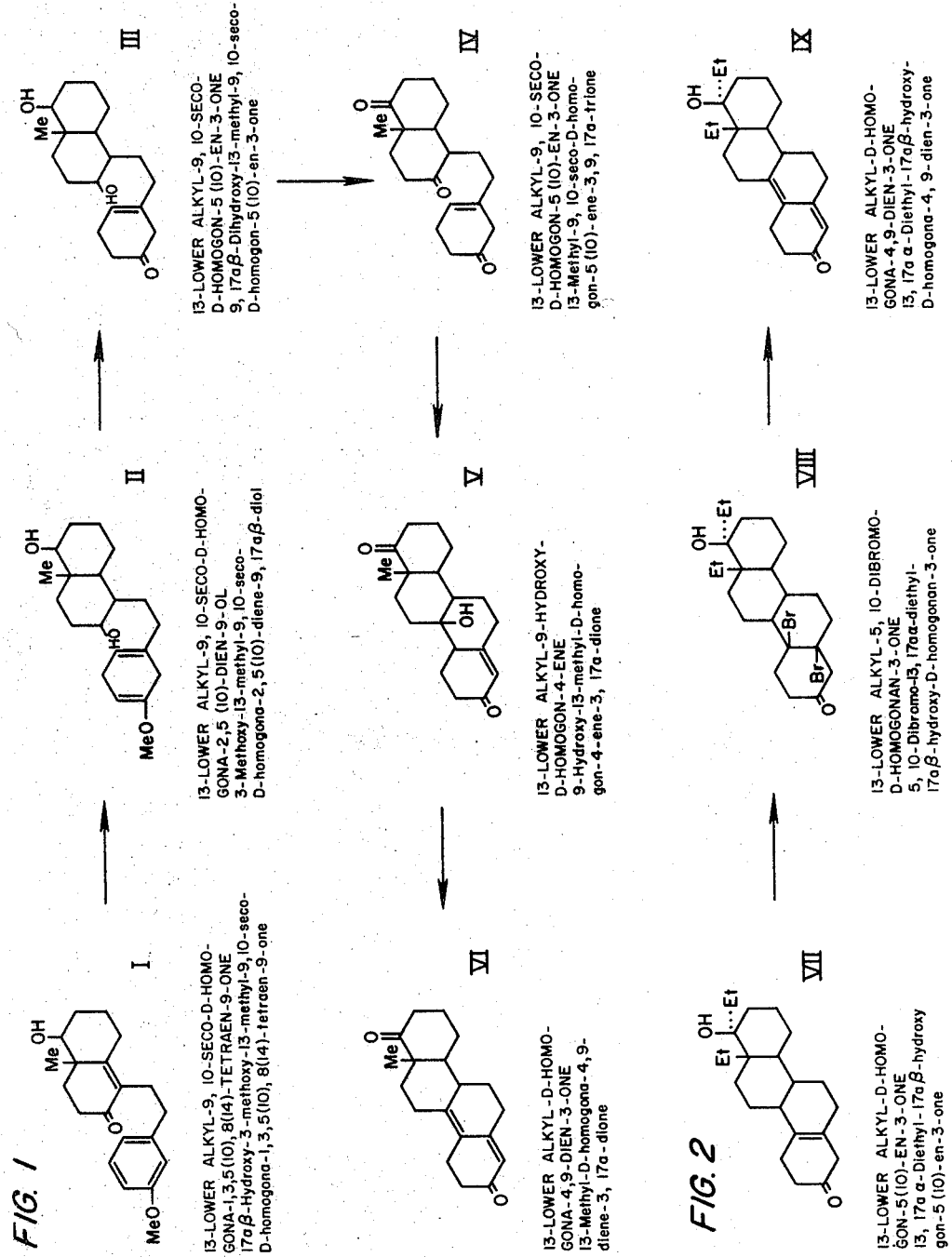

ABSTRACT OF THE DISCLOSURE

D-homogona-4,9-diene compounds possessing antiestrogenic, pituitary-blocking, anabolic, and progestational activity are disclosed as well as novel intermediates for their preparation.

---

This application is a division of application Ser. No. 386,986, now Pat. No. 3,458,579, filed Aug. 3, 1964, which is a continuation-in-part of copending application Ser. No. 194,972, now Pat. No. 3,502,699, filed May 15, 1962.

This invention relates to compositions of matter classified in the art of chemistry as substituted D-homogona-4,9-dien-3-ones and to processes for making and using such compositions.

The term "gonane," as used by chemists, refers to the unsubstituted tetracyclic perhydrocyclopentanophenanthrene nucleus. The designation "D-homo" indicates that the D-ring of the gonane nucleus is homologated, i.e., it is 6-membered rather than 5-membered as in normal gonanes. In the normal configuration of the gonane nucleus, the hydrogen atoms appearing at the 8-, 10-, and 13-positions possess what is designated as the β-configuration, i.e. they extend in a direction above the average plane of the tetracyclic ring system, and hydrogens present at the 9- and 14-positions possess what is designated as the α-configuration, i.e. they extend in a direction below the plane of the ring system. While the gonane compounds of this invention are named to describe the stereochemical configuration corresponding to that of the natural steroids, it is understood that the product of each of the given reactions is a racemic mixture of the named compound and its enantiomorph.

In describing the invention, reference will be made in this specification to the annexed drawing, wherein:

FIG. 1 illustrates schematically a reaction sequence for preparing a 13-lower alkyl-D-homogona-4,9-dien-3-one, specifically 13 - methyl - D - homogona - 4,9 - diene-3,17a-dione.

FIG. 2 illustrates schematically a reaction sequence for preparing a 13-lower alkyl-D-homogona-4,9-dien-3-one, specifically 13,17aα-diethyl-17aβ-hydroxy-D-homogona-4,9-dien-3-one.

The invention sought to be patented, in its principal composition aspect, is described as residing in the concept of a chemical compound having a molecular structure in which there is attached to the 13-position of a D-homogona-4,9-dien-3-one nucleus a lower alkyl radical. The tangible embodiments of the composition aspect of the invention possess the inherent general physical properties of being high melting, white crystalline solids, are substantially insoluble in water and are generally soluble in polar solvents such as dimethylacetamide. Examination of the compounds produced according to the hereinafter described process reveals, upon spectrographic analysis, spectral data confirming the molecular structures hereinbefore set forth. The aforementioned physical characteristics, taken together with the nature of the starting materials, elemental analysis and the mode of synthesis, positively confirm the structures of the compositions sought to be patented.

The tangible embodiments of the principal composition aspect of the invention possess the inherent applied use characteristics of exerting qualitatively varying hormonal effects in animals as evidenced by pharmacological evaluation according to standard test procedures. Such tangible embodiments show antiestrogenic, pituitary-blocking, anabolic, and progestational effects. This finding indicates their usefulness for weight gain and nitrogen retention, growth stimulation, postoperative recovery, and healing of wounds and burns. They are also useful for the treatment of disorders of the female reproductive tract, infertility, and habitual abortion.

The invention sought to be patented, in a principal process of making the compositions aspect, is described as residing in the concept of the sequence of reactions including: reducing a 17aβ-hydroxy-3-lower alkoxy-13-lower alkyl-9,10-seco-D-homogona-1,3,5(10),8(14)-tetraen-9-one to a 3-lower alkoxy-13-lower alkyl-9,10-seco-D-homogona-2,5(10)-diene-9,17aβ-diol under Birch reduction conditions, hydrolyzing the product to form a 9,17aβ-dihydroxy - 13 - lower alkyl-9,10-seco-D-homogon-5(10)-en-3-ene, oxidizing the hydroxy groups on said secohomogonene to keto groups, cyclizing the product under aldol condensation conditions, and dehydrating the resulting tetracyclic compound derived therefrom.

The invention sought to be patented in a second composition aspect is described as residing in the concept of a 9,10-seco-D-homogon-5(10)-ene-3,9,17a-trione nucleus having attached thereto in the 13-position a lower alkyl group.

The tangible embodiments of said second composition aspect possess the applied use characteristic of being intermediates for the preparation of compositions exerting antiestrogenic, anabolic, and progestational effects.

The invention sought to be patented in a third composition aspect is described as residing in the concept of a 9,17aβ-dihydroxy-9,10-seco-D-homogon-5(10)-en - 3 - one nucleus having attached thereto in the 13-position a lower alkyl group.

The tangible embodiments of said third composition aspect possess the applied use characteristic of being intermediates for the preparation of compositions exerting antiestrogenic, anabolic, and progestational effects.

The invention sought to be patented in a fourth composition aspect is described as residing in the concept of a 3-lower alkoxy-9,10-seco-D-homogona-2,5(10)-diene-9,17aβ-diol nucleus having attached thereto in the 13-position a lower alkyl group.

The tangible embodiments of said fourth composition aspect possess the applied use characteristic of being intermediates for the preparation of compositions exerting antiestrogenic, anabolic, and progestational effects.

The invention sought to be patented in a fifth composition aspect is described as residing in the concept of a 9-hydroxy-D-homogon-4-ene-3,17a-dione having attached thereto in the 13-position a lower alkyl group.

The tangible embodiments of said fifth composition aspect possess the applied use characteristic of being intermediates for the preparation of compositions exerting antiestrogenic, anabolic, and progestational effects.

The invention sought to be patented in a second process aspect is described as residing in the concept of cyclizing a 13-lower alkyl-9,10-seco-D-homogon-5(10)-ene-3,9,17a-trione under aldol condensation conditions to form a 9-hydroxy-13-lower alkyl-D-homogon-4-ene-3,17a-dione.

The manner and process of making and using the invention will now be generally described so as to enable a person skilled in the art of chemistry to make and use the same, as follows:

Referring now to FIG. 1, wherein the compounds are assigned Roman numerals for identification, the sequence of reactions involved is the process aspect of the invention is illustrated for a specific embodiment, namely 13-methyl-D-homogona-4,9-diene-3,17a-dione (VI). 17aβ-hydroxy-3-methoxy-13-methyl-9,10-seco - D - homogona-1,3,5(10), 8(14)-tatraen-9-one (I) dissolved in a solvent such as tetrahydrofuran is added to a solution of lithium in liquid ammonia. This "Birch reduction" is conducted and terminated according to conventional procedure to yield 3-methoxy-13-methyl-9,10-seco - D - homogona - 2,5 (10)-diene-9,17aβ-diol (II). Acid hydrolysis with a weak acid such as acetic acid or oxalic acid in a solvent such as methanol results in the hydrolysis of the 3-methoxy group to produce 9,17aβ-dihydroxy-13-methyl-9,10-seco-D-homogon-5(10)-en-3-one (III). Oxidation with chromic acid yields 13-methyl-9,10-seco-D-homogon-5(10)-ene-3,9,17a-trione (IV). When this trione is subjected to alkaline or acidic conditions, an aldol condensation occurs, resulting in ring-closure to 9-hydroxy-13-methyl-D-homogon-4-ene-3,17a-dione (V). Use of an activated fuller's earth accomplishes this ring-closure. By treating this 9-hydroxy compound with either iodine in a solvent such as benzene, or p-toulenesulfonic acid in acetic acid, dehydration to the desired 13-methyl-D-homogona-4,9-diene-3,17a-dione (VI) is accomplished. Compound VI has been found to possess considerable progestational activity.

We have found that other starting materials can be used for the above-mentioned synthetic sequence in place of 17aβ-hydroxy-3-methoxy-13-methyl-9,10-seco - D - homogona-1,3,5(10),8(14)-tetraen-9-one. There can be at the 17a-position a ketone instead of a hydroxy group. Furthermore, there need not be a double bond at the 8(14)-position; thus a 9,10-secogona-1,3,5(10)-triene is also useful as a starting material. When such a secogonatriene is used, it can have at the 9-position a hydroxy group rather than a ketone. The limitation on such variants is that there can not be used as a starting material in the present process a secogona-1,3,5(10), 8(14)-tetraene bearing a hydroxy group at the 9-position, since the hydroxy group of such a compound will be cleaved by the Birch reduction of the aromatic ring. Except for this limitation, starting materials bearing any of the above-mentioned variations are useful in the process of the invention, and processes utilizing any of these materials are equivalent to the process as specifically claimed. The reason for this equivalence is that the Birch reduction reduces any ketone to a hydroxy group and reduces the 8(14) double bond, if present.

This synthetic route is useful for the preparation of D-homogona-4,9-dienes having a methyl group at the 13-position thereof and gona-4,9-dienes having a polycarbon alkyl group at the 13-position thereof, such as ethyl, propyl, butyl, and hexadecyl. This procedure is furthermore applicable to the preparation of compounds having a variety of substituents thereon. There can be prepared, for example, compounds having at the 1,2,4,6, or 7-positions thereof lower alkyl groups or lower alkoxy groups. Processes for preparing any of the above-mentioned substituted D-homogona-4,9-dienes are the full equivalents of the processes specifically claimed, and intermediate compounds bearing these substituents are the full equivalents of the intermediate compounds specifically claimed.

It will also be apparent that in place of the 3-methoxy group in the starting material for this multi-stage process, there can be another lower alkoxy group, a cycloalkoxy group, an alkenyloxy group, or other similar groups. Processes utilizing such varied compounds are the full equivalents of those utilizing the 3-methoxy compounds, and those intermediate compounds bearing such groups are the full equivalents of those bearing a 3-methoxy group.

Referring now to FIG. 2, there is illustrated an alternative process for the preparation of compositions of the present invention, specifically the preparation of 13,17aα-diethyl-17aβ-hydroxy-D-homogona-4,9-dien-3-one (IX). A solution of 13,17aα-diethyl-17aβ-hydroxy-D-homogon-5(10)-en-3-one (VII) in pyridine is added to a soluiton of pyridine perbromide hydrobromide in pyridine and the mixture stirred for a period of approximately ten minutes to an hour. Heating at an elevated temperature such as 100° C. for an additional period of time, e.g. twenty minutes to more than one hour, results in the formation of the dehydrobrominated product (IX).

Compound IX was administered for seven days to young castrated male rats. Anabolic potency was evaluated by means of the change in weight of the levaton ani muscle. At the end of the test period, Compound IX was found to possess anabolic activity equal to the standard testosterone propionate. Androgenic potency was evaluated by means of the change in weight of the ventral prostate gland and serinal vesicles. The ratio of anabolic to androgenic activity was 5, compared with a ratio of 1 for testosterone propionate. Since the presence of androgenic, or masculinizing, activity in an anabolic agent, which is used in the treatment of women and children as well as men, is disadvantageous, it is apparent that the anabolic/androgenic ratio of 5 is decidedly superior to that of the standard testosterone propionate.

The bromination-dehydrobromination sequence is most conveniently performed in one vessel as a continuous process. The bromination occurs almost immediately at room temperature. A subsequent increase is the temperature of the reaction medium aids in the dehydrobromination process. The product is isolated by conventional technique, utilizing, for example, solution in an organic solvent, an acid wash, and recrystallization from an appropriate solvent such as ethyl acetate, ether, etc.

The reaction sequence can be carried out as a two-step procedure, in which the intermediate 5,10-dibromo compound (VIII) is isolated. In order to obtain this dibromo intermediate, the bromination should be conducted at a temperature no higher than 0° C.

The above-mentioned reaction sequence for preparing a 13-alkyl-D-homogona-4,9-dien-3-one is a general one and can be applied to a variety of starting materials having the 13-alkyl-D-homogon-5(10)-en-3-one nucleus. There can be, for example, at the 17a-position, a keto or ketal group, or a free or esterified hydroxy group. The acid portion of such an ester group can consist of a lower alkanoic acid such as propionic, an aralkanoic acid such as 3-phenylpropionic, an alkenoic acid such as 10-undecenoic acid, or a cycloalkyl-alkanoic acid such as 3-cyclopentyl-propionic acid. There can also be at the 17a-position a hydroxy group and any member of the group consisting of alkyl, alkenyl, alkynyl, and haloalkylnyl. The latter groups are typified by the methyl, ethyl, vinyl, ethynyl, propynyl, and chloroethynyl groups. Compounds bearing any of the above-mentioned groups or structures are the full equivalents of those compounds specifically claimed.

The alkyl group in the 13-position can include ethyl, propyl, isopropyl, butyl, hexyl, and hexadecyl, all of which groups are equivalent for purposes of this invention.

There can also be substituted on the 1,2,6, or 7-positions of the 13-alkylgon-5(10)-en-3-one one or more lower alkyl groups such as methyl, ethyl, or propyl; lower alkoxy groups such as methoxy, ethoxy, or propoxy; alkenyloxy goups such as allyloxy; cycloalkoxy groups such as cyclopentyloxy; or hydroxy groups. The product D-homogona 4,9-dienes obtained from these substituted gon-5(10)-enes bear the same substitutents as the starting materials and are the full equivalents of the compounds specifically claimed.

When it is desired to perform the bromination-dehydrobromination procedure with a 13-alkyl-D-homogon-5-

(10)-en-3-one having an unsaturated group attached thereto, the unsaturated group being reactive to a brominating agent, it is necessary to use an additional molecular equivalent of the brominating agent. An example of such an unsaturated group is the vinyl group. Following the debromination procedure, it is necessary to regenerate the vinyl group from the dibromoethyl compound resulting therefrom by treatment with a reagent such as sodium iodide in acetone.

In addition to the compound mentioned above, other 13-alkyl-D-homogona-4,9-dien-3-one products of thin reaction sequence posses unusual biological activity. When the compound 17aα-chloroethynyl-13-ethyl-17aβ-hydroxy-D-homogona-4,9-dien-3-one was administered to female rabbits in the Clauberg procedure, it was found to possess 700% of the progestational activity of the standard, naturally occurring hormone progesterone. Other particularly active compounds include 13-ethyl-17aα-ethynyl-17aβ-hydroxy-D-homogona-4,9-dien-3-one and 13-ethyl-17aβ-hydroxy-D-homogona-4,9-dien-3-one, both of which compounds possess progestational activity.

It is apparent that the D-homogona-4,9-diene compositions of this invention having a 17a-keto group may be reduced by means of a reagent such as sodium borohydride to the corresponding 17aβ-hydroxy compounds. Such 17aβ-hydroxy compounds can be esterified with any of a variety of acids as hereinbefore enumerated. Ketalization is accomplished by treatment of a ketone with an alcohol such as ethylene glycol or ethanol using an acidic catalyst such as p-toluenesulfonic acid.

The 13-alkyl-D-homogon-5(10)-en-3-one starting materials for the preparation of the D-homogona-4,9-dienes of the present invention may be obtained by procedures described in Belgian Pat. 608,370 and in copending application, Ser. No. 228,384, filed Oct. 4, 1962.

The 9,10-seco starting materials utilized in the multistage method for the synthesis of D-homogona-4,9-dienes can be prepared as described in Belgian Patents 595,384, 595,385, 595,386, and 595,387 wherein the preparation of 17aβ-hydroxy-3-methoxy - 13 - methyl-9,10-seco-D-homogona-1,3,5(10),8(14)-tetraen-9-one is specifically described. Preparation of starting materials having a 13-polycarbon alkyl group is readily accomplished by utilizing the methods disclosed in said Belgian patents.

The compositions of this invention are formulated for pharmaceutical use as solid capsules, tablets, suppositories, etc. by combining them with conventional carriers. Such conventional solid carriers include magnesium carbonate, magnesium stearate, talc, sugar, lactose, dextrin, pectin, starch, gelatin, tragacanth, methylcellulose, and sodium carboxymethylcellulose. Diluents, flavoring agents, solubilizers, lubricants, suspending agents, binders, or tablet-disintegrating agents may be employed. Liquid preparations such as solutions, suspensions, or emulsions may also be prepared. A water-propylene glycol solution may be used for parenteral injection. An aqueous suspension suitable for oral use can be made by utilizing natural or synthetic gums, resins, methyl cellulose, or other well-known suspending agents.

Representative formulations embodying specific compositions of this invention follow:

A pharmaceutical tablet for use as an oral anabolic agent consists of the following ingredients:

|  | Mg. |
|---|---|
| 17aα - chloroethynyl - 13 - ethyl-17aβ-hydroxy-D-homogona-4,9-dien-3-one | 5 |
| Carboxymethylcellulose (viscosity 400 cps.) | 15 |
| Lactose powder | 25 |
| Redried corn starch | 25 |
| Magnesium stearate powder | 4 |
|  | q.s. |
|  | 200 |

A capsule for use as an oral anabolic agent contains, in encapsulating gelatin, the following ingredients:

|  | Mg. |
|---|---|
| 17aα - chloroethynyl - 13 - ethyl-17aβ-hydroxy-D-homogona-4,9-dien-3-one | 5 |
| Finely divided silica lubricant | 5 |
| Magnesium stearate powder | 5 |
| Powdered corn starch | 113 |
| Lactose powder, q.s. |  |
|  | 245 |

An anabolic agent suspension for oral use consists of the following ingredients per 5 cc.:

|  | Mg. |
|---|---|
| 17aα - chloroethynyl - 13 - ethyl-17aβ-hydroxy-D-homogona-4,9-dien-3-one | 5.0 |
| Magnesium aluminum silicate (thickening agent) | 37.5 |
| Carboxymethylcellulose of lower viscosity | 37.5 |
| Polyoxyethylene sorbitan monolaurate | 50.5 |
| Glycerin | 150.0 |
| Sucrose | 2000.0 |
| Methyl p-hydroxybenzoate | 5.0 |
| Propyl p-hydroxybenzoate | 1.0 |
| Flavor and distilled water, q.s. |  |

An anabolic agent suspension for parenteral use consists of the following ingredients per cc.:

|  | Mg. |
|---|---|
| 17aα - chloroethynyl - 13 - ethyl-17aβ-hydroxy-D-homogona-4,9-dien-3-one | 0.5 |
| Benzyl alcohol | 10.0 |
| Sodium chloride | 90.0 |
| Polyoxyethylene sorbitan monooleate | 4.0 |
| Sodium carboxymethylcellulose | 5.0 |
| Water for injection, q.s. |  |

Pediatric drops for use as an anabolic agent consist of the following ingredients per drop (0.05 cc.):

|  | Mg. |
|---|---|
| 17aα-chloroethynyl - 13 - ethyl-17aβ-hydroxy-D-homogona-4,9-dien-3-one | 0.500 |
| Magnesium aluminum silicate (thickening agent) | 0.375 |
| Polyoxyethylene sorbitan monolaurate | 0.500 |
| Disodium phosphate heptahydrate | 0.375 |
| Citric acid monohydrate | 0.060 |
| Glycerin | 1.250 |
| Methyl p-hydroxybenzoate | 0.025 |
| Propyl p-hydroxybenzoate | 0.005 |
| Butyl p-hydroxybenzoate | 0.020 |
| Distilled water | 0.015 |
| Sodium saccharin | 0.013 |
| Sorbitol and flavor, q.s. |  |

A long-acting anabolic agent tablet consists of the following ingredients:

|  | Mg. |
|---|---|
| 17aα-chloroethynyl-13-ethyl-17aβ-hydroxy-D - homogona-4,9-dien-3-one | 5 |
| Water-insoluble acid carboxyvinyl polymer of acrylic acid copolymerized with 0.75–2% of polyallyl sucrose (the Carbopol 934 of U.S. Pat. 2,909,462) | 150 |
| Magnesilm stearate powder | 2 |
| Lactose, q.s. |  |

EXAMPLE 1

17aβ-hydroxy-13-methyl-D-homogona-4,9-dien-3-one

Stir 3-methoxy-3-methoxy-13-methyl-D-homogona - 2,5 (10)-dien-17aβ-ol (M.P. 149–153°, 4 g.) at room temperature under nitrogen is methanol (200 cc.) containing water (70 cc.), isopropyl alcohol (40 cc.) and oxalic acid dihydrate (5 g.) for 1½ hours. Filter the reaction mixture, add the filtrate to brine, and extract the resulting mixture with ether. Evaporate the washed and dried extracts to give a gum which crystallizes on trituration with ethyl acetate. Recrystallization from ethyl acetate yields 17aβ-hydroxy-12-methyl-D-homogona-5(10)-en-3-one (2.8 g.), M.P. 105–110°.

Add the 5(10)-en-3-one (2.8 g.) with stirring to a solution of pyridine perbromide hydrobromide (3.2 g.) in pyridine (80 cc.) and continue stirring for 1 hour at room temperature and then for 30 minutes on a steam bath; pour the cooled mixture into water (750 cc.) and extract with ether; evaporate the washed and dried extracts and recrystallize the residue from ethyl acetate to obtain 17aβ-hydroxy-13-methyl-D-homogona-4,9-dien-3-one (0.65 g.), M.P. 136–8.5°; UV: 310 (20,850).

EXAMPLE 2

13-ethyl-17aβ-hydroxy-D-homogona-4,9-dien-3-one

Add to a solution of 13-ethyl-17aβ-hydroxy-D-homogon-5(10)-en-3-one (3.3 g.) in pyridine (110 cc.), pyridine perbromide hydrobromide (3.49 g.) and stir the solution at room temperature for 30 minutes and on the steam bath for a further 30 minutes. Pour the cooled reaction mixture into water (800 cc.), extract with ether, and wash, dry and evaporate the extracts. Recrystallize the residue from ethyl acetate to obtain 13-ethyl-17aβ-hydroxy-D-homogona-4,9-dien-3-one (1.76 g.), M.P. 156–8°; UV: 306 (21,900). Found (percent): C, 79.9; H, 9.3. $C_{20}H_{28}O_2$ requires (percent): C, 79.95; H, 9.4.

EXAMPLE 3

3-methoxy-13-methyl-9,10-seco-D-homogona-2,5(10)-diene-9,17aβ-diol

Add a solution of 17aβ-hydroxy-3-methoxy-13-methyl-9,10-seco-D-homogona-1,3,5(10), 8(14)-tetraen - 9 - one (4.55 g.) in tetrahydrofuran (50 cc.) to a solution of lithium (300 mg.) in liquid ammonia (350 cc.). Add a further 300 mg. of lithium (total=6 gram-atoms) and stir the mixture for 10 minutes. Discharge the blue color by the addition of solid ammonium chloride and work up to isolate the product in quantitative yield. Dissolve the residue in tetrahydrofuran (100 cc.) and add this solution to a stirred solution of lithium (1.2 g., 14 gram atoms) in liquid ammonia (500 cc.). After stirring for 15 minutes, discharge the blue color with ethanol (10 cc.) and work up to obtain the product as a colorless gum. This gum is readily crystallized on rubbing with ether to obtain 3-methoxy-13-methyl-9,10-seco-D-homogona - 2,5 (10)-diene-9,17aβ-diol as colorless needles (3.1 g., 70%); M.P. 106–111°; infrared absorption 3350, 1695, 1665, 1120, 1147, 1038, 1018 and 786.

EXAMPLE 4

9,17a-dihydroxy-13-methyl-9,10-seco-D-homogon-5(10)-en-3-one

Add 3-methoxy-13-methyl-9,10-seco-D-homogona - 2,5 (10-diene-9,17a-diol (5 g.) to methanol (100 cc.) containing glacial acetic acid (8.8 cc.), and reflux the mixture for 5 minutes (or allow to stand overnight at room temperature). Add water (800 cc.) to the cooled solution. Extract with ether (4× 100 cc.), wash with water (2× 200 cc.) and saturated brine, and dry over magnesium sulfate. Evaporate the solvent to leave a residue, which, when recrystallized from ether, yields 9,17a-dihydroxy-13-methyl-9,10-seco-D-homogon-5(10)-en-3 - one (3.74 g.), M.P. 67–70° (the cooled and resolidified material has M.P. 124–133°), infrared absorption 3400, 1700.

EXAMPLE 5

13-methyl-9,10-seco-D-homogon-5(10)-ene-3,9,17a-trione

Oxidize 9,17a-dihydroxy-13-methyl-9,10-seco-D - homogon-5(10)-en-3-one (0.67 g.) in acetone (80 cc.) with chromic acid to give a pale yellow gum (0.56 g., 80%) which crystallizes slowly on keeping at 0° for several days. Recrystallize from petrol containing a trace of ethyl acetate to yield colorless needles, M.P. 64–69°. Recrystallize once more, and distill in a short path apparatus to obtain pure 13-methyl-9,10-seco-D-homogon-5(10)-en-3, 9,17a-trione; M.P. 68–71°; infrared absorption ($CS_2$); 1715.

Calculated for $C_{19}H_{30}O_3$ (percent): C, 75.5; H, 8.7. Found (percent): C, 75.5; H, 8.7.

EXAMPLE 6

9-hydroxy-13-methyl-D-homogon-4-ene-3,17a-dione

Chromatograph the crude oxidation product from the previous Example 5 on activated fuller's earth (Florex XX5) (20 g.).

Elute with benzene and with benzene-ether to obtain a highly crystalline compound (220 mg., 40%); M.P. 205–208°. Recrystallize from chloroform-benzene to obtain 9-hydroxy-13-methyl-D-homogon-4-ene-3,17a-dione; M.P. 205.5–207.5°; infrared absorption 3390, 1700, 1685, 1628, 1260, 1209, 1186, 1104, 1071, 925 and 871; light absorption 243 (10,500).

Calculated for $C_{19}H_{26}O_3$ (percent): C, 75.5; H, 8.7. Found (percent): C, 75.65; H, 8.7.

EXAMPLE 7

13-methyl-D-homogona-4,9-diene-3,17a-dione

Add a very small crystal of iodine to a solution of 9-hydroxy-13-methyl-D-homogon-4-ene-3,17a - dione (0.42 g.) in benzene (70 cc.), and reflux the mixture for 30 minutes. Remove the solvent almost completely under reduced pressure to leave a yellow gum which readily crystallizes. Recrystallize from ethanol to obtain 13-methyl-D-homogona-4,9-diene-3,17a-dione as clusters of pale yellow crystals (270 mg., 68%), M.P. 150–160°. Sublime this material and recrystallize from methanol to obtain the analytical sample, M.P. 165.5–167°; infrared absorption 1715, 1672; light absorption 302 (16,700).

Calculated for $C_{19}H_{24}O_2$ (percent): C, 80.2; H, 8.5. Found (percent): C, 80.05; H, 8.55.

EXAMPLE 8

13-methyl-D-homogona-4,9-diene-3,17a-dione

Add 9-hydroxy-13-methyl-D-homogon-4 - ene - 3,17a-dione (250 mg.) in benzene (20 cc.) to a solution of p-toluenesulfonic acid (120 mg.) in acetic acid (2 cc.) and reflux the mixture for two hours. After cooling, add ether (50 cc.), wash the solution with sodium bicarbonate solution and saturated brine, and dry. Remove the solvent and recrystallize the product from petrol-ether to obtain 13-methyl-D-homogona-4,9-diene-3,17a-dione (120 mg.), M.P. 164–166°.

EXAMPLE 9

9,17aβ-dihydroxy-13-methyl-D-homogon-4-en-3-one

Cool a solution of 9-hydroxy-13-methyl-D-homogon-4-ene-3,17a-dione (100 mg.) in absolute ethanol (10 cc.) to 8° and reduce with sodium borohydride (10 gm.) in ethanol (2 cc.). Recrystallize from chloroform-benzene to obtain 9,17a-dihydroxy-13-methyl-D-homogon-4-en-3-one (56 mg.), M.P. 200–204; infrared absorption 3390, 1684, 1627, 1269, 1208, 1179, 1106, 1072, 925 and 871; light absorption 243 (12,200).

Calculated for $C_{19}H_{28}O_3$ (percent): C, 75.0; H, 9.3. Found (percent): C, 75.3; H, 8.9.

EXAMPLE 10

17aβ-hydroxy-13-methyl-D-homogona-4,9-dien-3-one

Dehydrate 9,17aβ - dihydroxy-13-methyl-D-homogon-4-en-3-one with p-toluenesulfonic acid as in Example 8 to obtain 17aβ-hydroxy-13-methyl-D-homogona-4,9-dien-3-one, M.P. 136–138.5°.

EXAMPLE 11

17aβ-hydroxy-13-methyl-D-homogona-4,9-dien-3-one

Cool a solution of 13-methyl-D-homogona-4,9-diene-3, 17a-dione (230 mg.) in ethanol (25 cc.) to 8° and reduce with sodium borohydride (20 mg.). Work up the reaction mixture in conventional manner and recrystallize the product from ether-petrol-benzene (trace) to obtain 17aβ-hydroxy-13-methyl-D-homogona - 4,9 - dien-3-one (157 mg., 68%), M.P. 137–139.5°.

EXAMPLE 12

13-methyl-D-homogona-4,9-diene-3,17-a-dione

Add 8 N chromic acid to a solution of 17aβ-hydroxy-13-methyl-D-homogona-4,9-dien-3-one (0.645 g.) in acetone (44 cc.) containing anhydrous magnesium sulfate (0.9). Stir for three minutes and add isopropyl alcohol (3 cc.), followed by sodium carbonate (3 g.). After stirring for 5 minutes, filter the mixture, and evaporate the filtrate; recrystallize from ethyl acetate to obtain 13-methyl-D-homogona-4,9-diene-3,17a-dione (0.45 g.), M.P. 165–166.5°; ultraviolet: 306 (20,000).

EXAMPLE 13

13-ethyl-D-homogona-4,9-diene-3,17a-dione

Add 8 N chromic acid (.13 cc.) to a solution of 13-ethyl-17a-hydroxy-D-homogona-4,9-dien-3-one (1.0 g.) in acetone (90 cc.) containing magnesium sulfate (1.35 g.). Stir for 3 minutes, and add isopropyl alcohol (10 cc.), followed by sodium carbonate (5 g.). Recover the product as in the previous example, and recrystallize from ethyl acetate to obtain 13-ethyl-D-homogona-4,9-diene-3,17a-dione (0.76 g.), M.P. 193–195°; ultraviolet: 306 (20,900).

Calculated for $C_{20}H_{26}O_2$ (percent): C, 80.5; H, 8.8. Found (percent): C, 80.4; H, 8.6.

EXAMPLE 14

17aβ-hydroxy-13-methyl-D-homogona-4,9-dien-3-one, 3-phenylpropionate

Add a solution of 3-penyl propionyl chloride (1 g.) in benzene (3 cc.) to a solution of 17aβ-hydroxy-13-methyl-D-homogona-4,9-dien-3-one (1 g.) in pyridine (3.5 cc.) at −20°. Leave the mixture overnight at −10°, pour onto crushed ice and extract with ether-benzene. Wash the extracts in turn with 2 N aqueous potassium hydroxide, water, 2 N hydrochloric acid, and brine; dry and evaporate to dryness. Dissolve the residue in benzene and chromatograph on silica gel to obtain the title product; light absorption 305 (20,000); infrared absorption 1745, 1670, 1620.

EXAMPLE 15

13-ethyl-17aβ-hydroxy-D-homogona-4,9-dien-3-one, propiopate

Add a solution of propionyl chloride (0.5 cc.) in benzene (3 cc.) to a solution of 13-ethyl-17aβ-hydroxy-D-homogona-4,9-dien-3-one (0.8 g.) in pyridine (3 cc.) at 0°. Leave the mixture overnight at room temperature and then work up as in Example 14 to obtain the title product (0.8 g.); infrared absorption 1732, 1665, 1635.

EXAMPLE 16

13-ethyl-17aβ-hydroxy-D-homogona-4,9-dien-3-one, 3-phenylpropionate

Substitute 13-ethyl - D - homo-17aβ-hydroxygona-4,9-dien-3-one for the starting material in Example 14 to afford the title product. Light absorption 305 (20,000); infrared absorption 1745, 1670, 1620.

EXAMPLE 17

17aα-ethynyl-17aβ-hydroxy-13-methyl-D-homogona-4,9-dien-3-one

Add a solution of 17aα-ethynyl-17aβ-hydroxy-13-methyl-D-homogon-5(10)-en-3-one (0.68 g.) in pyridine (5 cc.) with stirring to a solution of pyridine perbromide hydrobromide (0.7 g.) in pyiridine (7.5 cc.) under nitrogen. Carry out the reaction and work up the product as in Example 1 to obtain the title product; light absorption 306 (20,000); infrared absorption 3310, 3220, 2100, 1635 1600.

EXAMPLE 18

17aα-ethynyl-17aβ-hydroxy-13-methyl-D-homogona-4,9-dien-3-ene

Pass a slow stream of acetylene through liquid ammonia (100 cc.) in a flask which is cooled in a bath containing solid carbon dioxide and acetone and introduce potassium (7.6 g.) in portions. Increase the stream of acetylene, and when the blue color is discharged, add a solution of 13-methyl - D - homogona-4,9-diene-3,17a-dione (14 g.) in benzene (100 cc.) and ether (100 cc.). Pass in acetylene for 3 hours, then allow the reaction mixture to warm up to 10° and stand for 18 hours. Add water and extract the mixture with ether. Wash the organic solution with water until neutral, dry and evaporate. Recrystallise the residue from methanol to obtain the title product. Ultraviolet λ maximum 306 mµ (19,000); infrared 3380, 3200, 1640, 1600 cm.$^{-1}$.

EXAMPLE 19

17aα-ethyl-17aβ-hydroxy-13-methyl-D-homogona-4,9-dien-3-one

Add a solution of 17aα-ethyl-17aβ-hydroxy-13-methyl-D-homogon-5(10)-en-3-one (2 g.) in pyridine (15 cc.) with stirring to a solution of pyridine perbromide hydrobromide (2.03 g.) in pyridine (15 cc.) under nitrogen. Carry out the reaction and work up the product as in Example 1 to obtain (from benzene-ether) the title product; light absorption 305 (20,000); infrared absorption 3400, 1645, 1605, 1575.

EXAMPLE 20

13-ethyl-17aα-ethynyl-17aβ-hydroxy-D-homogona-4,9-dien-3-one

Add a solution of 13-ethynyl-17aα-ethynyl-17aβ-hydroxy-D-homogon-5(10)-en-3-one (1.75 g.) in pyridine (15 cc.) to a solution of pyridine perbromide hydrobromide (1.71 g.) in pyridine (100 cc.) at 0°, and heat the reaction mixture gradually up to 100°; cool, pour into water and extract the product by means of ether; dry and evaporate; recrystallise the residue from ethyl acetate to obtain the title product (0.70 g.), M.P. 163.5–165°; ultraviolet 307 (22,300.).

EXAMPLE 21

17aα-chloroethynyl-12-ethyl-17aβ-hydroxy-D-homogona-4,9-dien-3-one

Dissolve 17aα-chloroethynyl-13-ethyl-17aβ-hydroxy-D-homogon-5(10)-en-3-one (2.70 g.) in pyridine (100 cc.), chill to 0° and add pyridine perbromide hydrobromide (2.5 g.). Allow the reaction mixture to reach room temperature with stirring, heat gradually to 100° on a water bath, cool, pour into water, and extract with ether. Wash, dry and evaporate the ether and recrystallize the residue twice from ethyl acetate to obtain the title compound (0.85 g.), M.P. 208–209° C.; λ infrared absorption 2.90, 6.03, 6.25µ; λ ultraviolet absorption 309 mµ (ε 20,000).

Calculated for $C_{22}H_{27}O_2Cl$ (percent): C, 73.62; H, 7.58; Cl, 9.88. Found (percent): C, 73.63; H, 7.84; Cl, 9.85.

EXAMPLE 22

13,17aα-diethyl-17aβ-hydroxy-D-homogona-4,9-dien-3-one

Add 17aα-diethyl-17aβ-hydroxy-D-homogon-5(10)-en-3-one (2.5 g.) to pyridine perbromide hydrobromide (2.4 g.) in pyridine (105 cc.), stir the solution for one hour at room temperature and one hour on a steam bath. Pour the cooled reaction mixture onto ice and extract the product by means of ether. Dry and evaporate. Recrystallize the residue from ethyl acetate to obtain the title product (0.91 g.), M.P. 153°; ultraviolet absorption 311 mµ (ε 19,850).

Calculated for $C_{22}H_{32}O_2$ (percent): C, 80.49; H, 9.8.
Found (percent): C, 80.25; H, 9.58.

We claim:
1. 13,17aα - diethyl - 17aβ-hydroxy-D-homogona-4,9-dien-3-one.
2. 17aα - chloroethynyl - 13 - ethyl-17aβ-hydroxy-D-homogona-4,9-dien-3-one.
3. 13-methyl-D-homogona-4,9-diene-3,17a-dione.
4. 17aβ - hydroxy - 13-methyl-D-homogona-4,9-dien-3-one.
5. 3 - methoxy - 13-methyl-9,10-seco-D-homogona-2,5(10)-dione-9,17aβ-diol.
6. 9,17aβ - dihydroxy-13-methyl-9,10-seco-D-homogon-5(10)-en-3-one.
7. 13 - methyl - 9,10-seco-D-homogon-5(10)-ene-3,9,17a-trione.
8. 9 - hydroxy - 13 - methyl-D-homogon-4-ene-3,17a-dione.

References Cited
UNITED STATES PATENTS
3,374,255   3/1968   Windholz et al. _____ 260—397.4

BERNARD HELFIN, Primary Examiner

G. A. SCHWARTZ, Assistant Examiner

U.S. Cl. X.R.
260—613